Feb. 24, 1959

W. P. ASTEN 2,874,602

APPARATUS FOR MAINTAINING CONSTANT THE VIBRATION FREQUENCY OF A TUNING FORK

Filed March 22, 1957

William P. Asten
INVENTOR.

BY Hurvitz & Rose

ATTORNEYS

United States Patent Office 2,874,602

Patented Feb. 24, 1959

2,874,602

APPARATUS FOR MAINTAINING CONSTANT THE VIBRATION FREQUENCY OF A TUNING FORK

William P. Asten, Aldie, Va.

Application March 22, 1957, Serial No. 647,912

3 Claims. (Cl. 84—409)

Figures 1, 2:
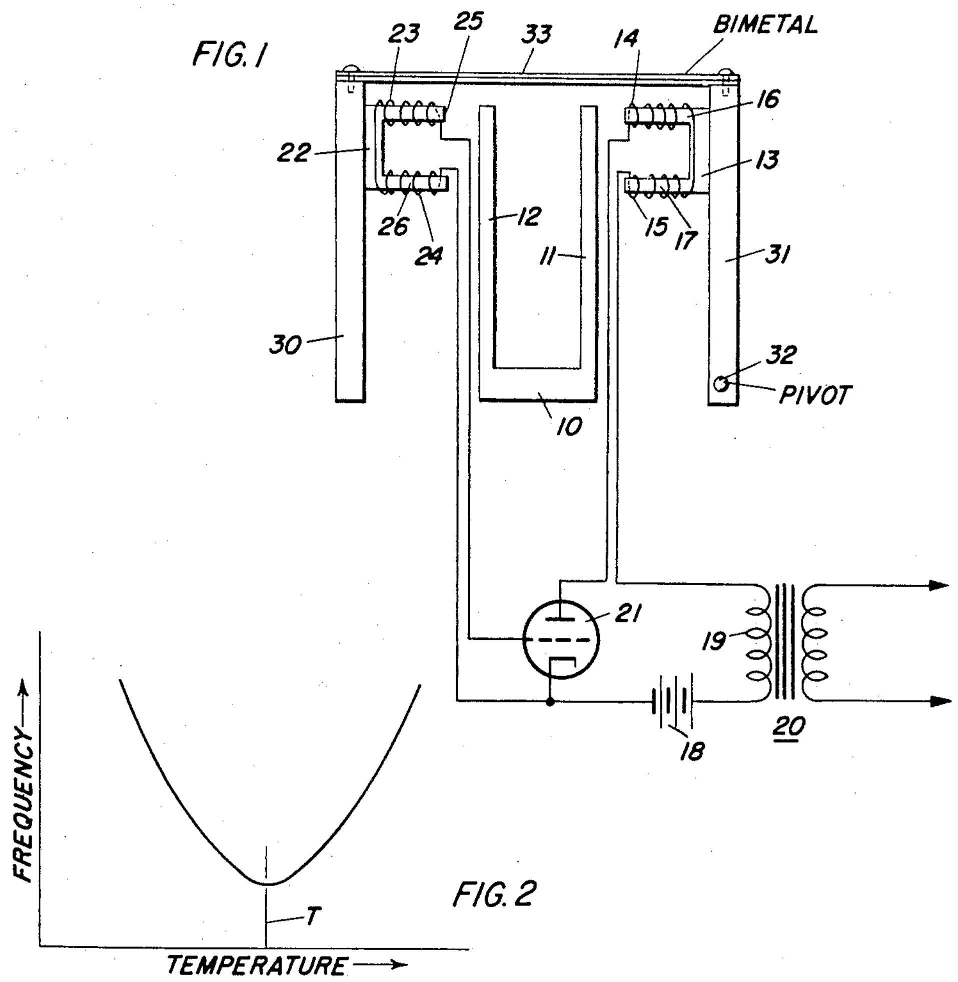

The present invention relates generally to mechanically vibrating devices, and more particularly to systems for maintaining constant the frequency of vibration of mechanically vibrating devices on variation of temperature.

Many applications exist for mechanically vibrating devices, such as tuning forks, reeds, or the like. These are, for example, frequently employed to generate an alternating current of constant frequency, and to this end are driven electromagnetically, the natural frequency of the device establishing frequency. In general, the alternating current is generated in stationary pick-up coils by variation of magnetic flux in a magnetic field in which the pick-up coils are disposed, the variation of magnetic flux being provided by vibration of the vibrating device. The latter is in turn driven by one or more driving coils, which are energized by the alternating current.

For the sake of example only, the invention will be described as applied to a tuning fork, in the text.

The frequency of a tuning fork changes with variation of the temperature of the tuning fork and of its associated magnets. The primary cause of the changes of frequency with temperature relate to changes in dimensions and modulus of elasticity of the tines of the fork, although other secondary temperature responsive changes occur. Frequency variations due to dimensional changes may be obviated by properly selecting the relative lengths, thicknesses and widths of the tuning forks. Residuary changes remain however, due to variation of modulus of elasticity with temperature, of the fork metal. In the case of some metals of which tuning forks are made the latter variation of frequency with temperature is direct, while with other metals it is inverse. Still other metals are known, for example, Ni-Span-C, in which the curve of frequency variation with temperature has a minimum, on either side of which the frequency rises, so that a variation of temperature either above or below the value for which frequency is minimum results in an increase in frequency, due to variations of modulus of elasticity of the fork metal with temperature.

It is the object of the present invention to provide a system of frequency regulation for tuning forks which employ metals such that the curve of frequency variation with temperature possesses a minimum.

It is known that the frequency of vibration of a tuning fork may be varied by varying the spacing between the tines of the fork and the coil structure, and moreover that one tine may be placed adjacent a pick-up coil, and the other adjacent a driving coil, in which case frequency may preferably be varied by varying the location of the drive coil relative to its adjacent tine. In such case reducing the spacing results in a decrease of frequency.

In accordance with the present invention the frequency of a tuning fork may be varied as a function of temperature by means of a bimetal which controls the spacing of the pick-up coil from the drive coil, and more particularly the spacing of one of the coils from the adjoining tine may be varied in the same sense for either an increase or a decrease of temperature, and for which frequency is a minimum.

More specifically, the pick-up coil may be mounted on a stationary arm and the driving coil on an arm pivoted adjacent one end and free at the other. The free end of the pivoted arm is joined to an end of a bimetal, the other end being fixed, and the bimetal is designed to be undeflected for the temperature of minimum frequency. On variation of temperature the spacing of the drive coil from its adjacent tine is varied in the same sense whether the variation of temperature is positive or negative, since deflection or bending of the bimetal in either sense, from its undeflected condition, effects a similarly directed motion of the pick-up coil relative to its adjacent tine. The functioning of the present invention depends, accordingly, on that property of suitable bimetals, by virtue of which the distance between the ends of the bimetals varies similarly for an increase or decrease of temperature, with respect to maximum distance appropriate to a reference temperature.

In a modification of the system the bimetal is mounted adjustably along the arms, so that it may be set at variable distances from the pivot of the pivoted arm. Thereby the degree of motion of the pivoted arm for a given deflection of the bimetal is subject to adjustment.

It is, accordingly, a broad object of the present invention to provide a new and improved tuning fork, the frequency of vibration of which remains substantially constant with change of temperature.

It is another object of the present invention to provide a new and improved tuning fork whose frequency of vibration is maintained substantially constant with variation of temperature by varying the distance between the tines of the tuning fork and a driving coil in the same sense for either an increase or a decrease of temperature from a predetermined value of temperature.

Another object of the invention resides in the provision of a novel system for controlling the frequency of a tuning fork as a function of deviation of its temperature in either sense from a predetermined value, by varying the spacing of a drive coil and a pick-up coil in the same sense on either an increase or decrease of temperature from the predetermined value.

It is still another object of my invention to provide a tuning fork and a drive coil and pick-up coil therefor, and to provide a bimetal for establishing the distance between the drive coil and pick-up coil as a direct function of the distance between two points of the bimetal, the bimetal providing a maximum distance between the points at a temperature of the tuning fork for which either increase or decrease of temperature will result in a correspondingly directed variation of vibrational frequency.

Figure 3:
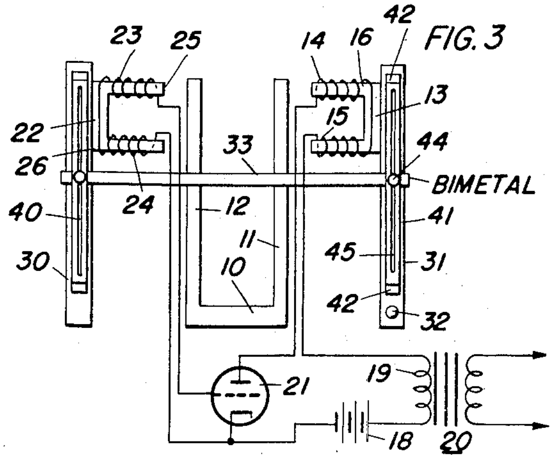

The above and still further objects, features and advantages of the present invention will become apparent upon consideration of the following detailed description of one specific embodiment thereof, especially when taken in conjunction with the accompanying drawings, wherein:

Figure 1 of the drawings is a diagrammatic illustration of a vibrational tuning fork and its associated drive and pick-up means, together with a bimetallic frequency control device according to the present invention;

Figure 2 is a curve of frequency variation with temperature for the tuning fork of Figure 1, in the absence of temperature compensation; and Figure 3 is a diagrammatic illustration of a modification of the system of Figure 1 which permits control of the magnitude of effect of the bimetallic frequency control device.

Referring now more particularly to Figure 1 of the drawings, a tuning fork is identified by reference numeral 10, the fork having tines 11 and 12. A drive means for the tuning fork 10 comprises a permanent magnetic core 13 and serially connected driving coils 14 and 15, disposed on opposite pole pieces 16, 17 of magnetic core 13. The driving coils 14, 15 are energized from any suitable source of current, such as a battery 18, via the primary winding 19 of a transformer 20, and via the anode to cathode circuit of a triode 21, or an equivalent amplifier.

A pick-up means comprises a permanent magnet core 22, having serially connected driving coils 23, 24 disposed on opposite pole pieces 25, 26 of the core 22. The driving coils 23, 24 are connected between the cathode and control electrode of the triode 21. The drive means comprising core 13 and coils 14, 15 is located adjacent tine 11 and the pick-up means comprising core 22 and coils 23, 24 is located adjacent tine 12. The tuning fork 10 and its drive and pick-up means are per se of generally conventional character. The curve of frequency variation with temperature for the tuning fork 10 is, by virtue of the character of the metal of which it is made, generally of the type illustrated in Figure 2 of the accompanying drawings. Here a temperature T exists for which the natural frequency of the tuning fork is a minimum, and either an increase or decrease of temperature T results in an increase of frequency.

The general mode of operation of the tuning fork system of Figure 1 is well understood, and is here repeated for convenience. It will be realized, however, that other forms of tuning forks, and of drive and pick-up configurations and circuitry, are well known, and are, for the purpose of the present invention, equivalent to the specific form illustrated and described, since the invention concerns a frequency control system for a tuning fork, employable in conjunction with a wide variety of tuning forks, provided only that they have the required temperature-frequency characteristic.

Describing now the mode of operation of the tuning fork system of Figure 1, at the point in the cycle of vibration of tines 10 and 11 at which they are at their extreme of displacement outwardly or inwardly, their velocity is zero. At their normal rest positions their velocities are maximum. When the velocity of the tines is zero no voltage is induced in the pick-up coils 23, 24 or 12, 13, and attraction of the magnets 13, 22 for the tines is essentially the same as for rest condition of the tines. The elastic forces of the tines drive them toward rest position, with constantly increasing acceleration, and the movement of the tines causes a voltage to be induced in the coils proportional to their velocities of the tines. The velocity is maximum as the tines pass through their normal rest position and the voltages induced are such as to cause the triode 21 to supply current to the drive coils 13, 14 such as to cause the tines 11, 12 to overshoot their rest positions. The force tending to cause overshoot is gradually reduced as the tines depart from their rest position, because their velocities decrease as the restoring forces due to the elastance of the tines increases with deflection. Eventually a rest position is reached, and the tines reverse their directions, the cycle of events repeating.

At the extremes of outward displacement of the tine 12, the elastance of the tine tends to drive the tines inwardly. The voltage induced in the pick-up coils 23, 24 during the inward motion is arranged to be of such polarity that negative potential is impressed on the control grid of triode 21, reducing the current to the drive coils 14, 15 and reducing the attraction of the core 13 for the tine 11. The attraction is minimum as the tine 11 passes its rest position, since tine velocity is then maximum. As the tine moves toward its inmost position, at which it is stationary, the negative voltage applied to the grid decreases, becoming zero when the tine attains its maximum inward displacement, so that the attraction of the coil 13 for the tine 11 is increased. The elastance of the tine 11 now drives it toward the core 13. The voltage provided at the control grid of triode 21 is now such as to increase the attraction of the core 13 for the tine 11, as the tine moves toward the core, until rest or zero position is attained. At this point the positive voltage applied at the grid of triode 21 is maximum, because the velocity of tine 12 is then maximum. As the tine 12 passes its rest position the positive voltage applied to the grid of triode 21 decreases, gradually decreasing the pull of core 13, until the tines again reach their outermost positions, when the cycle repeats. The system is therefore regenerative, and oscillations are sustained, provided system losses are sufficiently small.

It can be shown that the frequency of a tuning fork decreases, as the drive coil decreases its spacing from the associated tine. It is, therefore, feasible to compensate for the variations of frequency with temperature illustrated in Figure 2, provided it is possible to reduce the spacing of the tines 11 from the core 13 for either an increase or a decrease of temperature, and according to a suitable law of variation.

In accordance with the present invention the pick-up core 22 is secured to a stationary standard 30, while the core 13 is secured adjacent the free end of a standard 31, which is pivoted at its other end on a pin 32. Joining the free end of standard 31 to the corresponding fixed end of standard 30 is a bimetal 33. The bimetal 33 is so designed that its undeflected condition occurs for temperature T for which the frequency of the system of Figure 1 is a minimum. Either an increase or a decrease of temperature results in a bowing of bimetal 33, albeit in opposite senses. But, any bowing of bimetal 33, either inwardly or outwardly, effects movement of the free end of standard 31 toward the tine 11, and hence tends to decrease the frequency of the system. The decrease may be proportioned, by suitable design of the system, substantially to compensate for the increase of frequency which would have occurred in the absence of compensation. The frequency-temperature curve of the system is thus constrained to have a net zero slope, over a wide range of temperatures.

In the system of Figure 1 the distance between pivot 32 and bimetal 34 is fixed. This may be disadvantageous because different samples of metals may possess different slopes of their frequency vs. temperature curves. In accordance with a modification of the present invention, provision is made for adjusting the position of the bimetal 33 relative to the pivot 32. To this end straps 40 and 41 may be secured to the standards 30, 31, respectively, the straps extending parallel to the lengths of the standards. The straps 40, 41 may be spaced from the standards 30, 31, except adjacent the ends 42 thereof, where they may be permanently secured. Bimetal 33 slides between the straps 40, 41 and the standards 30, 31, respectively, so that it may be positioned at any desired distance from pivot 32. Set screws 44 may extend through threaded apertures in the bimetal 33, and through longitudinal slots 45 in straps 40, 41 and serve to clamp the bimetal 33 to the straps.

It will be obvious that a variety of devices may be employed for securing the bimetal 33 adjustably along the lengths of the standards 30, 31, without departing from the true scope of the invention. In any case, the bimetal now deflects perpendicularly of the plane of vibration of the tines 11, 12, and serves to vary the spacing with temperature of core 13 from tine 11 to an extent determined by the position of the bimetal 33 relative to pivot 32. Thereby, compensation is or may be effected for the varying slopes which may in practice be found to exist, in the curves of frequency vs. temperature, for various forks.

While my invention has been described in exemplary fashion as applying to a tuning fork, its application to a resonant reed, or to analogous vibrating members, will be obvious.

What I claim is:

1. A mechanical vibrating system comprising: electromagnetic drive means, electromagnetic pick-up means, a vibrator of magnetic material disposed in inductive relation to said electromagnetic drive means and said electromagnetic pick-up means, a circuit coupling said electromagnetic drive means and said electromagnetic pick-up means in self-oscillator relation, said vibrator having a characteristic of frequency variation with temperature having a minimum at a predetermined temperature and rising frequency with both increase and decrease of temperature with respect to said predetermined temperature, and means operatively associated with said vibrating system for decreasing the distance between said vibrator and at least one of said electromagnetic drive means and of said electromagnetic pick-up means in response to both increase and decrease of temperature with respect to said predetermined frequency.

2. The combination according to claim 1, wherein said last means includes a bimetal.

3. The combination according to claim 1, wherein said last means includes a bimetal having its greatest extension from one point thereof to another point thereof at said predetermined temperature, and arranged to reduce said extension in response to both an increase and a decrease of temperature with respect to said predetermined temperature, means for securing one of said points to at least one of said pick-up means and drive means, and means for securing the other of said points to the remaining one of said pick-up means and drive means.

References Cited in the file of this patent

UNITED STATES PATENTS

| | | |
|---|---|---|
| 1,653,794 | Whitehorn | Dec. 27, 1927 |
| 2,015,410 | Prescott | Sept. 24, 1935 |